United States Patent
Mackulin et al.

(10) Patent No.: US 8,074,933 B2
(45) Date of Patent: Dec. 13, 2011

(54) AIRCRAFT GRAYWATER EJECTION SYSTEM

(75) Inventors: Bryan J. Mackulin, Akron, OH (US); Mark A. Hampson, Akron, OH (US)

(73) Assignee: Goodrich Corporation, Charlotte, NC (US)

(*) Notice: Subject to any disclaimer, the term of this patent is extended or adjusted under 35 U.S.C. 154(b) by 493 days.

(21) Appl. No.: 12/362,821

(22) Filed: Jan. 30, 2009

(65) Prior Publication Data

US 2009/0212161 A1  Aug. 27, 2009

Related U.S. Application Data

(60) Provisional application No. 61/031,503, filed on Feb. 26, 2008.

(51) Int. Cl.
B64D 1/16 (2006.01)

(52) U.S. Cl. ........................ 244/136; 137/209; 137/899.2

(58) Field of Classification Search ................ 244/136; 137/206, 209, 899.2
See application file for complete search history.

(56) References Cited

U.S. PATENT DOCUMENTS

| | | | |
|---|---|---|---|
| 4,202,061 A * | 5/1980 | Waters | 4/317 |
| 4,332,040 A | 6/1982 | Palmer | |
| 4,744,385 A | 5/1988 | Houghton | |
| 4,868,932 A | 9/1989 | Thoma et al. | |
| 4,974,899 A | 12/1990 | Sargent | |
| 5,035,011 A | 7/1991 | Rozenblatt et al. | |
| 5,206,962 A | 5/1993 | Thorwaldson | |
| 5,232,010 A | 8/1993 | Rozenblatt et al. | |
| 5,305,792 A * | 4/1994 | Ellgoth et al. | 137/899.2 |
| 5,309,938 A * | 5/1994 | Ellgoth et al. | 137/334 |
| 5,445,196 A | 8/1995 | Tyree, Jr. | |
| 5,588,617 A * | 12/1996 | Bliss et al. | 244/1 N |
| 5,707,027 A * | 1/1998 | Hiesener | 244/118.5 |
| 5,711,038 A | 1/1998 | Niethammer et al. | |
| 6,006,766 A | 12/1999 | Soulages | |
| 6,189,944 B1 | 2/2001 | Piche | |
| 6,352,088 B1 | 3/2002 | Stegall | |
| 6,402,945 B1 | 6/2002 | Swales et al. | |
| 6,543,484 B1 | 4/2003 | Highsmith | |
| 6,640,701 B2 | 11/2003 | Hoffjann et al. | |
| 6,776,183 B1 | 8/2004 | Brooker et al. | |
| 6,804,840 B2 * | 10/2004 | Berman | 4/434 |
| 6,874,550 B2 | 4/2005 | Brooker | |
| 6,957,668 B1 | 10/2005 | Highsmith | |
| 7,118,677 B2 | 10/2006 | Hoffjann et al. | |
| 7,277,628 B2 | 10/2007 | Giamati | |
| 7,533,426 B2 * | 5/2009 | Pondelick | 4/651 |
| 2006/0225200 A1 * | 10/2006 | Wierenga | 4/664 |

* cited by examiner

*Primary Examiner* — Tien Dinh
*Assistant Examiner* — Michael Kreiner
(74) *Attorney, Agent, or Firm* — Cindy Murphy LLC

(57) ABSTRACT

An aircraft (10) having a cabin (14) with a plurality of potable-water-using stations (22) that drain graywater to a transfer tank (24). The graywater ejection system pressurizes the transfer tank (24) at appropriate times and/or places, so that graywater can be ejected through a drainmast (26) without the help of gravity. This graywater ejection system eliminates the need for a discharge line from the transfer tank (24) and frees the aircraft's fuselage (12) from having an inconvenient port associated with such a discharge line.

18 Claims, 4 Drawing Sheets

AIRCRAFT GRAYWATER EJECTION SYSTEM

RELATED APPLICATION

This application claims priority under 35 U.S.C. §119(e) to U.S. Provisional Patent Application No. 61/031,503 filed on Feb. 26, 2008. The entire disclosure of this provisional application is hereby incorporated by reference.

GENERAL FIELD

A graywater ejection system for an aircraft wherein graywater can be ejected during flight and/or when the aircraft is grounded.

BACKGROUND

An aircraft will typically include one or more potable-water-using stations (e.g., sinks, basins, beverage makers, ice makers, etc.) and each station will usually include a drain line for graywater. Graywater is a specific form of waste fluid that is no longer suitable for drinking but does not include septic wastes (i.e., it does not interact with toilet water). Graywater can include, for example, unfinished beverages poured down sinks and/or hand-washing water from lavatories.

An aircraft will usually include some type of graywater ejection system. In certain aircrafts and/or in certain aircraft orientations, graywater can gravity drain to a drainmast. If gravity draining is not always possible and/or practical, graywater can be stored in a tank, and a discharge line can extend from this storage tank to a port on the aircraft's fuselage. When the aircraft is grounded, the port can be opened by airline personnel and the stored graywater discharged from tank and into an appropriate sewer.

SUMMARY

An aircraft graywater ejection system allowing ejection of graywater through the drainmast without the help of gravity. The graywater can be ejected in the air whereby the aircraft need not carry this useless water weight throughout its entire flight. This arrangement is also advantageous when graywater is not ejected during flight, and is only discharged when the aircraft is grounded. Specifically, for example, the aircraft need not include a port on its fuselage for discharging graywater from a storage tank, as on-ground ejection can be accomplished through the drainmast. The absence of such a discharge port can enhance the smoothness of the fuselage and/or eliminate port-related issues (e.g., freezing closed, adequate sealing, etc.) from consideration.

These and other features of the aircraft graywater ejection system are fully described and particularly pointed out in the claims. The following description and annexed drawings set forth in detail certain illustrative embodiments of this arrangement, these embodiments being indicative of but a few of the various ways in which the principles may be employed.

DRAWINGS

DESCRIPTION

Figure 1:
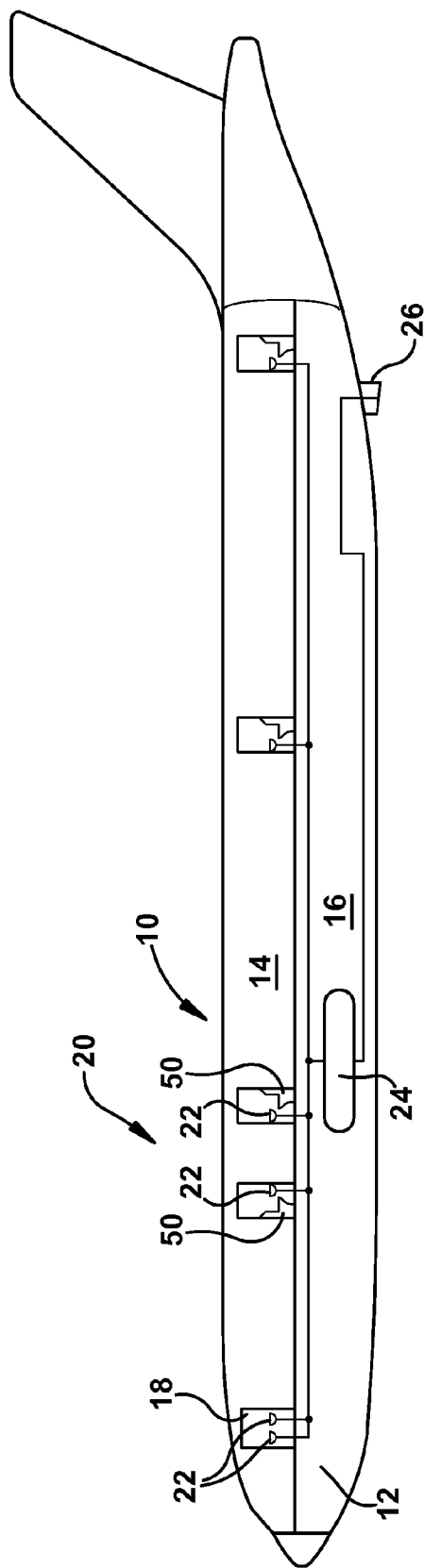
FIG. 1 is a view of an aircraft (with its fuselage partially removed) with a plurality of potable-water-using stations and a graywater ejection system associated therewith.

Referring now to the drawings, and initially to FIG. 1, an aircraft 10 is shown. The aircraft 10 comprises a fuselage 12 which defines a cabin 14 and a belly 16 underneath the cabin 14. In the illustrated aircraft 10, the cabin 14 includes a galley 18 and a lavatory 20, both of which are located in the cabin's fore area. A plurality of potable-water-using stations 22 are located in the galley 18 and/or the lavatory 20. These stations 22 can comprise, for example, a beverage maker (e.g., coffee brewer), a galley sink, an ice maker, a dishwasher, and/or a wash basin.

A transfer tank 24 is positioned in the aircraft's belly 16 below the potable-water-using stations 22 (and thus in a fore portion of the fuselage 12). As explained in more detail below, each of the plurality of potable-water-using stations 22 drains graywater to the transfer tank 24. Notably, the aircraft 10 does not have a discharge line from the transfer tank 24 to a port on the fore portion of fuselage.

A drainmast 26 is mounted on an aft portion of the aircraft's fuselage 12. The drainmast 26 can be of any suitable construction that allows efficient and effective ejection of fluids from the aircraft 10 during flight. The drainmast 26 can also be compatible with airline equipment for routing ejected fluids to an appropriate sewer when the aircraft 10 is grounded.

Figure 2:
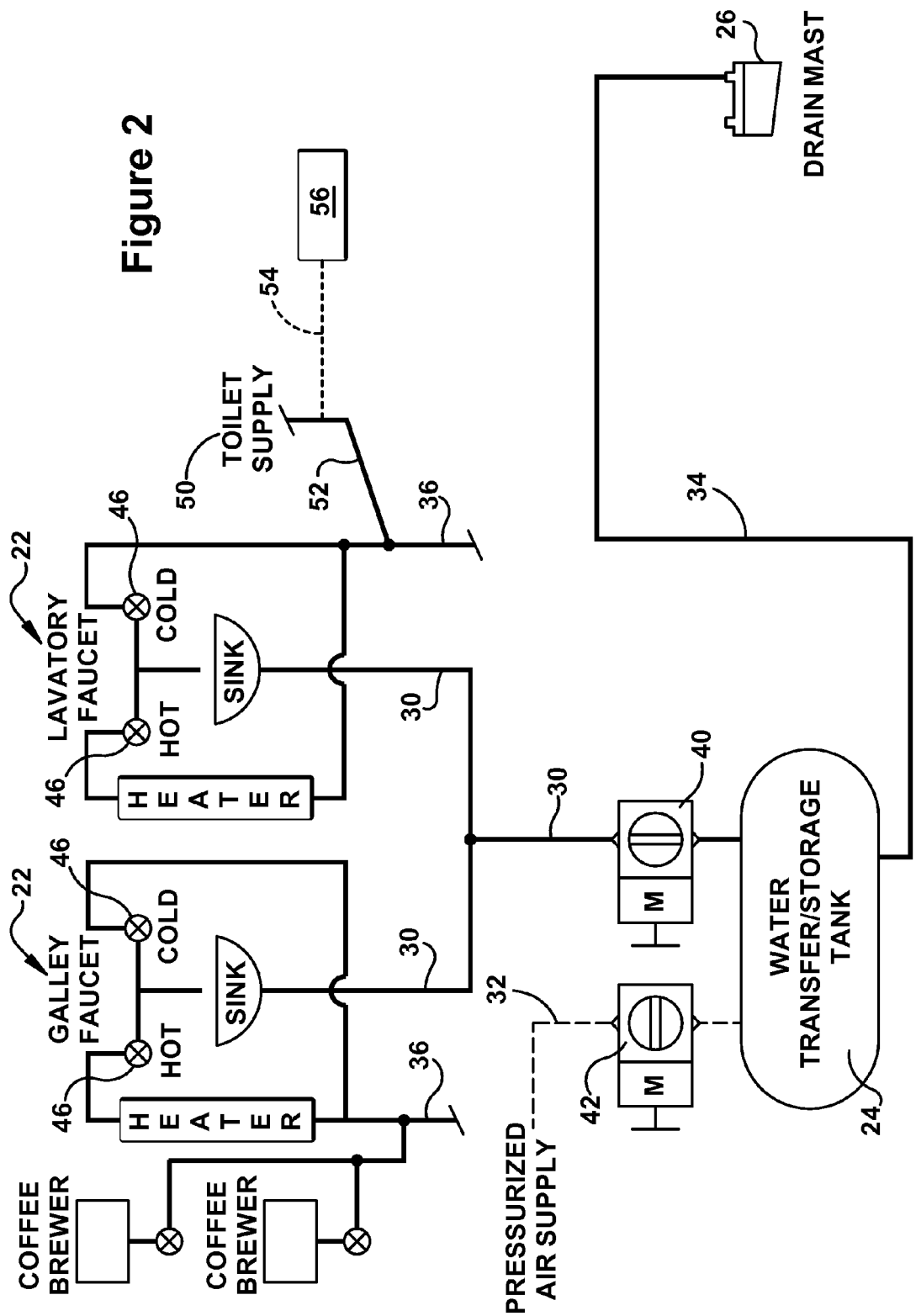
FIG. 2 is a schematic diagram of the aircraft graywater ejection system wherein graywater is being drained from the potable-water-using stations to a transfer tank.
Figure 3:
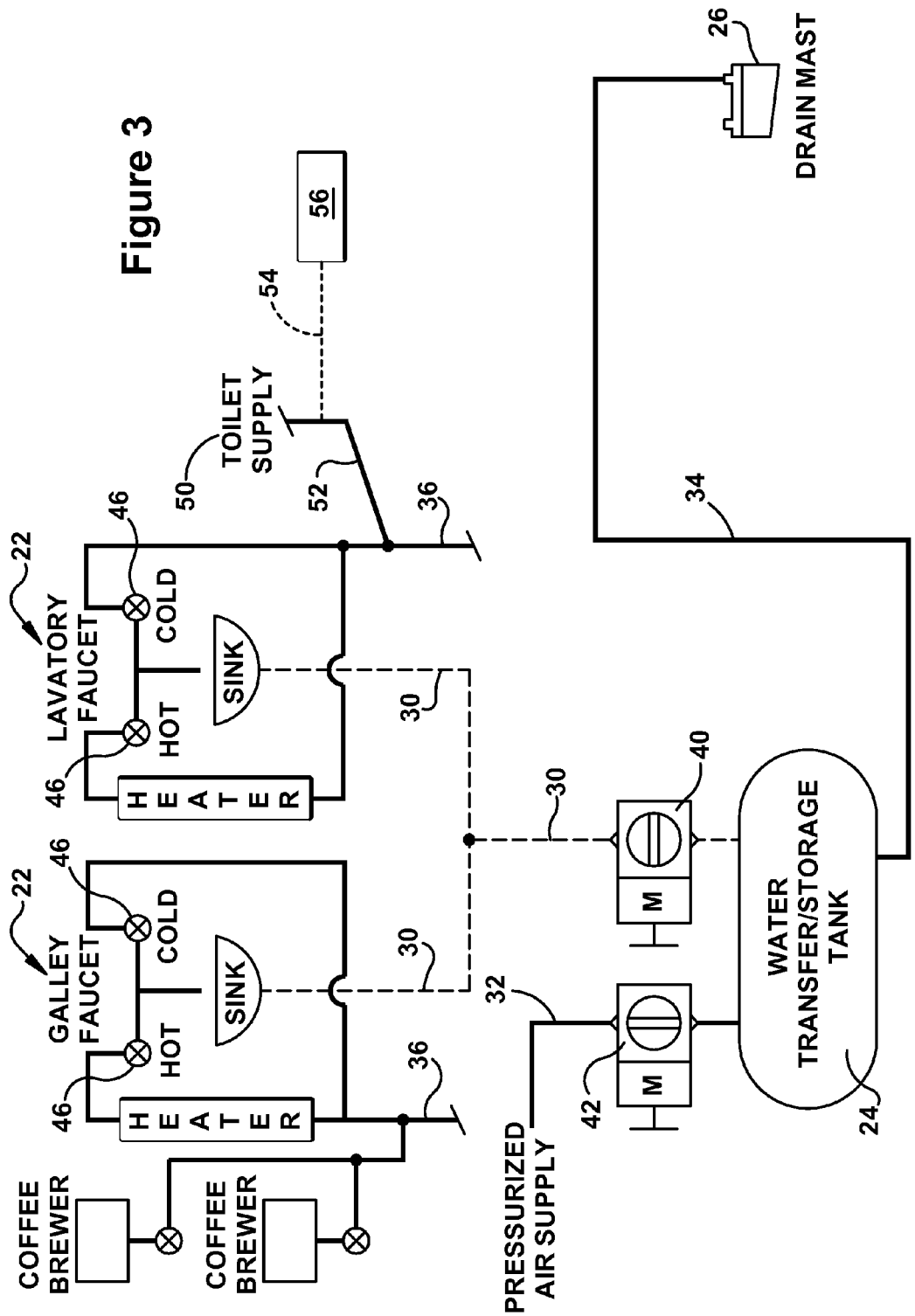
FIG. 3 is a schematic diagram of the aircraft graywater ejection system wherein graywater is being impelled from the transfer tank to the drainmast whereat it is ejected from the aircraft.

Referring now additionally to FIGS. 2 and 3, the aircraft's graywater ejection system can be explained in more detail. As shown somewhat schematically in the diagrams, the drainmast 26 can be positioned above the transfer tank 24 (and/or higher than at least some of the tank's expected water levels). This can be the case when the aircraft 10 is grounded, when it is substantially horizontal in flight, and when it is traveling downward for landing. In these orientations, graywater will not gravity drain from the transfer tank 24 to the drainmast 26.

The aircraft 10 includes tank-pressurizing means for pressurizing the transfer tank 24 so that graywater may be ejected through drainmast 26 without the help of gravity. The tank-pressurizing step can be performed when the aircraft 10 is in flight. Additionally or alternatively this pressurizing step can be performed while the aircraft 10 is grounded and the graywater ejected from the drainmast 26 can be routed to a sewer.

The potable-water-using stations 22 can each include a drain line 30 to the transfer tank 24. A tank-pressurizing line 32 extends from a tank-pressurizing means (e.g., a source of compressed air) to the transfer tank 24. An eject line 34 extends from the transfer tank 24 to the drainmast 26. The lines 30, 32, and 34 (and also lines 36, 52, and 54 introduced below) can be any pipe, conduit, tube and/or plumbing arrangement that establishes the intended fluid flow path. For example, in the illustrated embodiment, the stations' drain lines 30 have separate branchlets and a common branch into the tank 24.

The relative vertical positioning between the potable-water-using stations 22 and the transfer tank 24 usually permits graywater to be gravity drained from each station 22 through its respective drain line 30 to the transfer tank 24. Additionally or alternatively, with appropriate vacuum pumps (or other equipment) graywater can be vacuum drained from each station 22 through its respective drain line 30 to the transfer tank 24. In certain designs and/or at certain aircraft orientations, graywater in the transfer tank 24 can be gravity drained through the eject line 34 to the drainmast 26 when the transfer tank 24 is not pressurized.

A drain-only valve 40 (in the drain line(s) 30 upstream of the tank 24) and an eject-only valve 42 (in the tank-pressurizing line 32 upstream of the tank 24) can be provided and operated to prevent back flow of graywater into the stations 22 during tank pressurization. (This may also prevent graywater from draining from the station(s) 22 to the transfer tank 24 during the tank-pressurizing step.)

In the illustrated embodiment, the drain-only valve 40 is open and the eject-only valve 42 is closed when graywater is being drained from the stations 22 (through the drain line(s) 30) to the transfer tank 24. (See FIG. 2.) And the drain-only valve 40 is closed and the eject-only valve 42 is open when the graywater is being impelled from the transfer tank 24 (through the eject line 34) to the drainmast 26 for ejection therefrom. (See FIG. 3.)

The drain-only valve 40 can be normally opened and the eject-only valve 42 can be normally closed so that, without electrical power, the valve 40 is open and the valve 42 is closed. This would permit continued gravity draining of the potable-water-using stations 22 (and prevent tank-pressurization) if, for example, the aircraft 10 suddenly has a loss of power. Other electrical or mechanical devices can be employed to insure optimum valve settings in emergency or unexpected situations.

During normal operating conditions, the drain-only valve 40 can be closed upon the transfer tank 24 reaching a predetermined pressure threshold, and/or the eject-only valve 42 can be opened upon the water level in the tank 24 reaching a certain height. Valve-control logic can also be programmed so that the drain-only valve 40 is closed upon opening of the eject-only valve 42, and the eject-only valve 42 is closed upon opening of the drain-only valve 40.

The stations 22 can be supplied with potable water via supply lines 36. In the illustrated system, these potable water supply lines 36 cannot fluidly communicate with the transfer tank 24, the drain line(s) 30, and/or the eject line 34. This supply-drain isolation insures that graywater will not contaminate potable water.

Each supply line 36 can have one or more dispensers 46 at its outlet end which, when activated, dispense potable water at the respective station 22. The dispensers 46 can be mechanically activated (e.g., the turning of a faucet dispenser), electrically activated (e.g. an electrical gate dispenser), automatically activated (e.g., by a timer or event), and/or selectively activated by a user (e.g., by a passenger wishing to wash). If the corresponding drain line 30 has a stopple (not shown) on its input end, the stopple and the dispenser 46 can be connected (mechanically or electrically) so that dispenser activation causes opening of the stopple. Such a stopple can (or cannot) remain in a plugged position unless potable water is being supplied to the respective station 22.

The aircraft 10 can further include a toilet station 50 in the cabin 14 having a fill line 52 and a flush line 54. The fill line 52 can receive fluid from the supply lines 36 (if stringent safeguards are in place that absolutely prevent toilet water backflow into the potable-water-carrying lines 36). Or graywater (e.g., from the eject line 34) can be recycled into the fill line 52 (again with appropriate backflow safeguards) for use as toilet water. If water storage space (and/or weight) is not a concern, the eject line 34 can be isolated from the fill line 52.

The flush line 54 carries "blackwater" flushed from the toilet station 50, and definitely should not fluidly communicate with the supply lines 36. This type of waste water is also not suitable for ejection into the air during flight. Thus, the flush line 54 also should not fluidly communicate with the transfer tank 24, the drain line(s) 30, the eject line 34, and/or the drainmast 26. Typically, the flush line 54 is connected to a separate septic tank 56 which is emptied and sanitized when the aircraft 10 is grounded.

Figure 4:
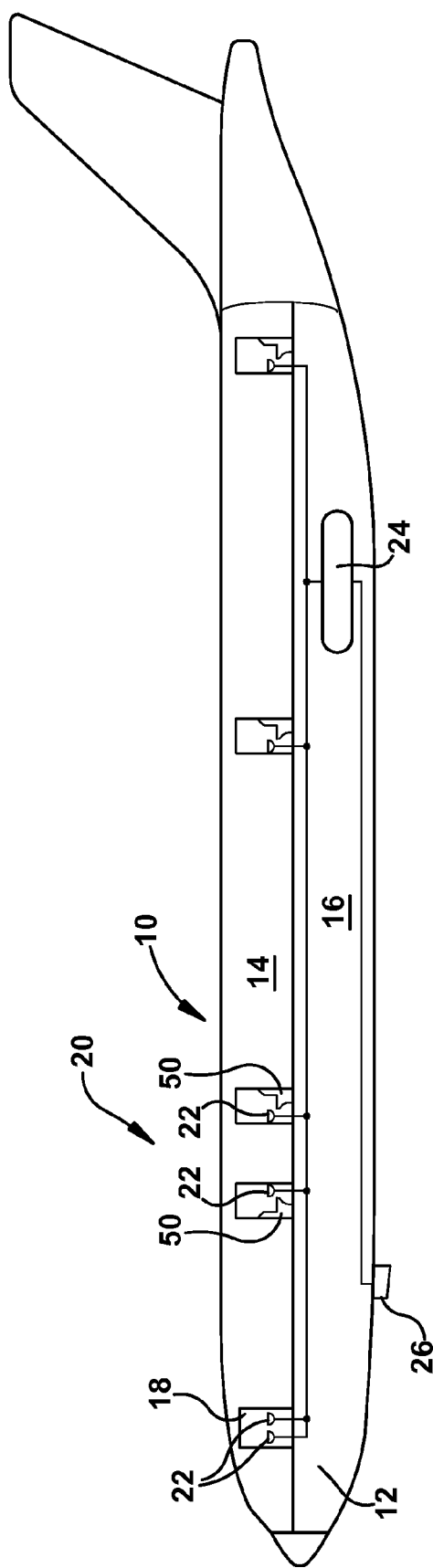
FIG. 4 is a view similar to FIG. 1, except that its drainmast is located in a fore portion of the aircraft fuselage and its water tank is located in an aft portion.

In the aircraft 10 shown in FIG. 1 and discussed above, the transfer tank 24 is positioned in a fore portion of the fuselage 12 and the drainmast 26 is mounted on an aft portion. As shown in FIG. 4, the transfer tank 24 could instead be positioned in an aft portion of the fuselage 12 and the drainmast 26 could instead be mounted on a fore portion. The aircraft's graywater ejection system could likewise be used on the latter tank-drainmast arrangement, in the same manner as described above. In fact, such a system could be used with any tank-drainmast arrangement to eject graywater without the help of gravity.

Although the aircraft 10 (and associated components, systems, and elements) have been shown and described with respect to a certain embodiment or embodiments, it is obvious that equivalent alterations and modifications will occur to others skilled in the art upon the reading and understanding of this specification and the annexed drawings. In regard to the various functions performed by the above described elements (e.g., components, assemblies, systems, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function. In addition, while a particular feature may have been described above with respect to only one or more of several illustrated embodiments, such feature may be combined with one or more other features of the other embodiments, as may be desired and advantageous for any given or particular application.

The invention claimed is:

1. An aircraft comprising
a fuselage defining a cabin;
a potable-water-using station in the cabin;
a transfer tank for graywater drained from the potable-water-using station, wherein the transfer tank is not in fluid communication with blackwater;
a drainmast mounted to the fuselage;
an eject line from the transfer tank to the drainmast;
tank-pressurizing means for pressurizing the transfer tank so that graywater is ejected through the drainmast without the help of gravity;
a drain line from the potable-water-using station to the transfer tank; and
a drain-only valve in the drain line upstream of the transfer tank that is closed during pressurizing of the transfer tank.

2. An aircraft as set forth in claim 1, wherein the aircraft is characterized by the absence of a discharge arrangement comprising a discharge line from the transfer tank to a port on the fuselage other than the eject line and the drainmast.

3. An aircraft as set forth in claim 1, wherein the aircraft is characterized by the absence of a tank discharge port on the fore portion of the fuselage.

4. An aircraft as set forth in claim 1, wherein graywater in the transfer tank is capable of being gravity drained through the eject line to the drainmast when the transfer tank is not pressurized.

5. An aircraft as set forth in claim 1, further comprising:
   a tank-pressurizing line for supplying pressurized air to the transfer tank; and
   an eject-only valve in the tank-pressurizing line upstream of the transfer tank that is open when pressurizing the transfer tank.

6. An aircraft as set forth in claim 5, further comprising a supply line of potable water, wherein this supply line cannot fluidly communicate with the drain line, the eject line, and/or the transfer tank.

7. An aircraft as set forth in claim 6, further comprising a toilet station in the cabin and a flush line through which blackwater is flushed from the toilet station, wherein the flush line cannot fluidly communicate with the drain line, the eject line, and/or the transfer tank.

8. An aircraft as set forth in claim 1, wherein the transfer-tank is positioned below the potable-water-using station when the aircraft is grounded.

9. An aircraft as set forth in claim 1, wherein the drainmast is positioned at or above expected water levels in the transfer tank when the aircraft is grounded.

10. An aircraft as set forth in claim 1, further comprising a supply line of potable water, wherein this supply line cannot fluidly communicate with the eject line, and/or the transfer tank.

11. An aircraft as set forth in claim 1, wherein the transfer tank is located in a fore portion of the fuselage and wherein the drainmast is mounted to an aft portion of the fuselage.

12. An aircraft as set forth in claim 1, wherein the transfer tank is located in an aft portion of the fuselage and wherein the drainmast is mounted to a fore portion of the fuselage.

13. An aircraft as set forth in claim 1, comprising a plurality of potable-water-using stations in the cabin, each station draining graywater to the transfer tank.

14. An aircraft as set forth in claim 13, wherein the cabin includes a galley and wherein at least one potable-water-using station is located in the galley.

15. An aircraft as set forth in claim 14, wherein at least one station comprises a beverage maker, wherein at least one station comprises an ice maker, wherein at least one station comprises a galley sink, wherein at least one station comprises a dishwasher, and/or wherein at least one station comprises a lavatory basin.

16. A method of ejecting graywater from the an aircraft, said method comprises:
    providing the aircraft of claim 1; and
    pressurizing the transfer tank to thereby eject graywater through the drainmast, wherein graywater cannot drain from the station to the transfer tank during said tank-pressurizing step.

17. A method as set forth in claim 16, wherein said-tank-pressurizing step is performed while the aircraft is grounded and wherein graywater ejected from the drainmast is routed to a sewer.

18. A method as set forth in claim 16, wherein said tank-pressurizing step is performed when the aircraft is in flight.

* * * * *